United States Patent
Schindele et al.

(10) Patent No.: US 10,006,441 B2
(45) Date of Patent: Jun. 26, 2018

(54) MANAGEMENT SYSTEM FOR OPERATING A WIND ENERGY PLANT AND METHOD USING THE MANAGEMENT SYSTEM

(75) Inventors: Lothar Schindele, Renningen (DE); Boris Buchtala, Muehlacker (DE); Bernd Schnurr, Lohr-Sendelbach (DE); Andreas Vath, Leidersbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 1400 days.

(21) Appl. No.: 13/392,877

(22) PCT Filed: Aug. 14, 2010

(86) PCT No.: PCT/EP2010/005003
§ 371 (c)(1),
(2), (4) Date: Apr. 26, 2012

(87) PCT Pub. No.: WO2011/023308
PCT Pub. Date: Mar. 3, 2011

(65) Prior Publication Data
US 2012/0200087 A1    Aug. 9, 2012

(30) Foreign Application Priority Data
Aug. 29, 2009   (DE) .................. 10 2009 039 340

(51) Int. Cl.
*F03D 7/02* (2006.01)
*F03D 7/04* (2006.01)

(52) U.S. Cl.
CPC .......... *F03D 7/0296* (2013.01); *F03D 7/043* (2013.01); *F03D 7/047* (2013.01);
(Continued)

(58) Field of Classification Search
None
See application file for complete search history.

(56) References Cited

U.S. PATENT DOCUMENTS

2006/0066111 A1 *  3/2006  Suryanarayanan et al. .... 290/44
2008/0118354 A1 *  5/2008  Jeppesen ............... F03D 7/0224
                                                    416/1
(Continued)

FOREIGN PATENT DOCUMENTS

EP     1 719 910 A1    11/2006
EP     2 108 827 A2    10/2009
WO    2008/000265 A1    1/2008

OTHER PUBLICATIONS

International Search Report corresponding to PCT Application No. PCT/EP2010/005003, dated May 2, 2011 (German and English language document) (5 pages).

*Primary Examiner* — Robert Fennema
(74) *Attorney, Agent, or Firm* — Maginot, Moore & Beck LLP

(57) ABSTRACT

A management system for a wind energy plant including at least one control unit, and a method using the management system are disclosed. The management system is used to coordinate component modules of the wind energy plant with vibration damping modules and/or load reduction modules, wherein a sensor system supplies data of the operating states of the component modules for a system analysis. For this purpose, reactive vibrations and/or predictive forecasts of vibrations of the wind energy plant, and predictive disturbance variables are registered, and the vibration damping modules and/or load reduction modules in the control unit are activated, wherein an actuator carries out damping measures and/or load reduction measures on the component modules in accordance with the vibration damping modules and/or load reduction modules of the control unit.

1 Claim, 5 Drawing Sheets

(52) U.S. Cl.
CPC ..... *F05B 2260/80* (2013.01); *F05B 2260/821* (2013.01); *F05B 2260/96* (2013.01); *F05B 2270/1095* (2013.01); *F05B 2270/334* (2013.01); *Y02E 10/723* (2013.01)

(56) References Cited

U.S. PATENT DOCUMENTS

| | | | |
|---|---|---|---|
| 2008/0145222 A1* | 6/2008 | Schellings | F03D 1/00 416/31 |
| 2009/0142178 A1* | 6/2009 | Nieuwenhuizen | 415/2.1 |
| 2009/0317250 A1* | 12/2009 | Gamble et al. | 416/1 |
| 2010/0050752 A1* | 3/2010 | Habets | 73/112.01 |
| 2010/0187820 A1* | 7/2010 | Wakasa et al. | 290/44 |

* cited by examiner

MANAGEMENT SYSTEM FOR OPERATING A WIND ENERGY PLANT AND METHOD USING THE MANAGEMENT SYSTEM

This application is a 35 U.S.C. § 371 National Stage Application of PCT/EP2010/005003, filed on Aug. 14, 2010, which claims the benefit of priority to Serial No. DE 10 2009 039 340.4, filed on Aug. 29, 2009 in Germany, the disclosures of which are incorporated herein by reference in their entirety.

BACKGROUND

The disclosure relates to a management system for a wind energy installation having at least one controller, and to a method using the management system. The management system is used for coordination of component modules in the wind energy installation, which are able to reduce loads and/or to damp oscillations, with a sensor system providing data relating to the operating states of the component modules for the management system.

A wind energy installation has a multiplicity of sensors, some of which predictively detect the wind field, analyze blade loads, check the load on a main shaft, measure reactions to a torque peak, monitor the gearbox state, and measure electrical variables of the generator for the frequency converter and the grid. At the same time, a modern wind energy installation offers a plurality of action options for the oscillation and damping behavior of the installation, for example by means of a pitch drive system, an azimuth drive system, a braking system, and active torque support, as well as by control of the frequency converter. These actuators can act on the component modules such as the rotor, gearbox, drive train and/or generator, the overall behavior of the wind energy installation being coordinated by the management system.

One problem with conventional management systems is that natural oscillations of the various components of the wind energy installation may build up, and the entire system may go out of control, as a result of which there may be an increased risk of damage to the wind energy installation.

One object of the disclosure is to specify a management system which allows improved coordination between the sensor system, actuator system, oscillation damping modules and component modules. A further object of the disclosure is to provide a method using the management system, which reduces loads, reduces oscillations and counteracts the risk of oscillations building up, in good time.

This object is achieved by the subject matter set forth below. Advantageous developments of the disclosure are also set forth below.

According to the disclosure, a management system is provided for a wind energy installation having at least one controller, and a method is provided using the management system. The management system is used for coordination of component modules in the wind energy installation, which are able to reduce loads and to damp oscillations, with a sensor system providing data relating to the operating states of the component modules for the management system, and allowing system analysis. For this purpose, reactive oscillations and/or loads and/or predictive prognosis of oscillations and/or loads of and/or on the wind energy installation as well as predictive disturbance variables are detected, and modules in the controller are activated, with an actuator system carrying out damping measures and/or load reduction measures on the component modules on the basis of the oscillation damping modules of the controller.

This management system has the advantage that reactive oscillations and/or loads and/or predictive prognosis of oscillations and/or loads on the wind energy installation as well as predictive disturbance variables are detected in good time and measures are initiated with the aid of the actuator system to protect the wind energy installation against damage and overloading, while at the same time improving the energy yield. For this purpose, the wind energy installation has a central controller, in which signals which are relevant for oscillation damping and/or load reduction are combined.

The central controller has control modules for a plurality of actuators by means of which the oscillation behavior and/or load behavior of the drive train can be influenced. These actuators include the capability for pitch control, individual-blade pitch control, action by braking apparatuses in the drive train, active torque support, which acts on the gearbox and provides damping capabilities, as well as electronic control for the generator and frequency converter. For this purpose, the central controller has logic on the basis of which a specific one of the available actuators for oscillation damping is either selected, or a group of actuators for oscillation damping is activated.

For this purpose, the sensors interact with system analysis which allows oscillation patterns and their association with suitable actuators with their damping, as well as linking of state monitoring means by selection of one actuator depending on the prior usage of the actuators and/or of the drive train elements. The information is linked in the management system, and individual measures for oscillation damping are derived from system analysis.

For this purpose, the sensor system in the wind energy installation provides multidimensional angle and/or acceleration signals and/or torque and/or force signals for the controller. The latter controls the damping of oscillations and the reduction of loads, caused by the wind, turbulence, the grid and/or the generator, by means of the units in the system, such as the pitch system, torque support, generator loads, frequency converter controllers, azimuth control, torsion-damping elements in the drive train. In this case, the management system also monitors any change in the typical forms of the natural oscillation over the course of time in the wind energy installation, and draws conclusions relating to wear and damage to individual components or component modules and/or subsystems. Furthermore, the remaining life of the wind energy installation can be deduced with the aid of statistical methods, on the basis of the measurement results from the sensor system with respect to previous loads.

The sensors can detect and also distinguish between oscillations caused by structure-borne sound in the wind energy installation and mechanical bending oscillations or torsional oscillations of the various component modules. In this case, the central controller reacts predictively as well as reactively, in that both reactive oscillations and loads as well as predictive prognosis of oscillations and/or loads of and/or on the wind energy installation are detected, and existing state variables of the wind energy installation are used and utilized.

In a further embodiment of the disclosure, the management system has a plurality of controllers for coordination of component modules of the wind energy installation with oscillation damping modules and/or modules which are able to reduce loads and/or to damp oscillations. These controllers can cooperate with one another or can be managed by a central control unit.

Preferably, the sensor system has wind field sensors, blade load sensors, main shaft load sensors, torque sensors, working material sensors, acceleration sensors and sensors for electrical variables of the generator, of the frequency converter and of the grid.

The disclosure furthermore provides that the sensor system for the management system has multidimensional acceleration sensors, orientation sensors and/or angle sensors for detection of the operating states of the component modules, for the detection of reactive oscillations and/or predictive prognosis of oscillations on the component modules of the wind energy installation, and for detection of predictive disturbance variables.

For this purpose, the wind energy installation may have various subsystems of a plurality of component modules, as well as the subsystem of a drive train, for which purpose the component modules may be associated with the main shaft, the torque support, the gearbox and the working material system for the gearbox. The management system according to the disclosure can distribute damping measures and/or load reduction measures between subsystems of a plurality of component modules such as these, with the component modules including the rotor with variable-pitch rotor blades and a rotor hub, the drive train with the main shaft, the gearbox and active torque support, the generator with a frequency converter and the azimuth drive.

The management system according to the disclosure provides not only communication between a plurality of controllers for subsystems but also communication with a central controller. In this case, the sensors in the sensor system may be associated with individual controllers for subsystems and/or a central controller for the management system.

Finally, the disclosure provides for the management system to have subsystems with an autonomous damping function, and for the management system to have a diagnosis device for diagnosis and recording of state data of components, component modules and/or subsystems of the wind energy installation.

A method using the management system has the following method steps. First of all, data is detected relating to the operating states of the component modules with respect to reactive oscillations and/or loads and/or predictive prognosis of oscillations and/or loads on the wind energy installation, and with respect to predictive disturbance variables. Then, actuators are activated for damping and/or load reduction of acute or predicted oscillation states and/or load states of component modules and/or of subsystems of the wind energy installation. Finally, electrical energy is generated, with matching to the frequency, current and voltage demand of the downstream grid.

If an oscillation damping function of a subsystem fails, the oscillation damping functions are distributed between remaining subsystems or component modules. Damage to a subsystem can be diagnosed by means of changes in the oscillation behavior of the subsystem. In addition, the state variables of a subsystem detected by the sensor system are subjected to system analysis in order to identify and to avoid load limits on the component modules at an early stage. Furthermore, the disclosure provides that the state variables detected by the sensor system and results of system analysis, are supplied to an information module, which has the advantage that the operating state of the wind energy installation can also be continuously recorded, and can be read for diagnosis and evaluation purposes.

BRIEF DESCRIPTION OF THE DRAWINGS

The disclosure will now be explained in more detail with reference to the following figures.

DETAILED DESCRIPTION

Figure 1:
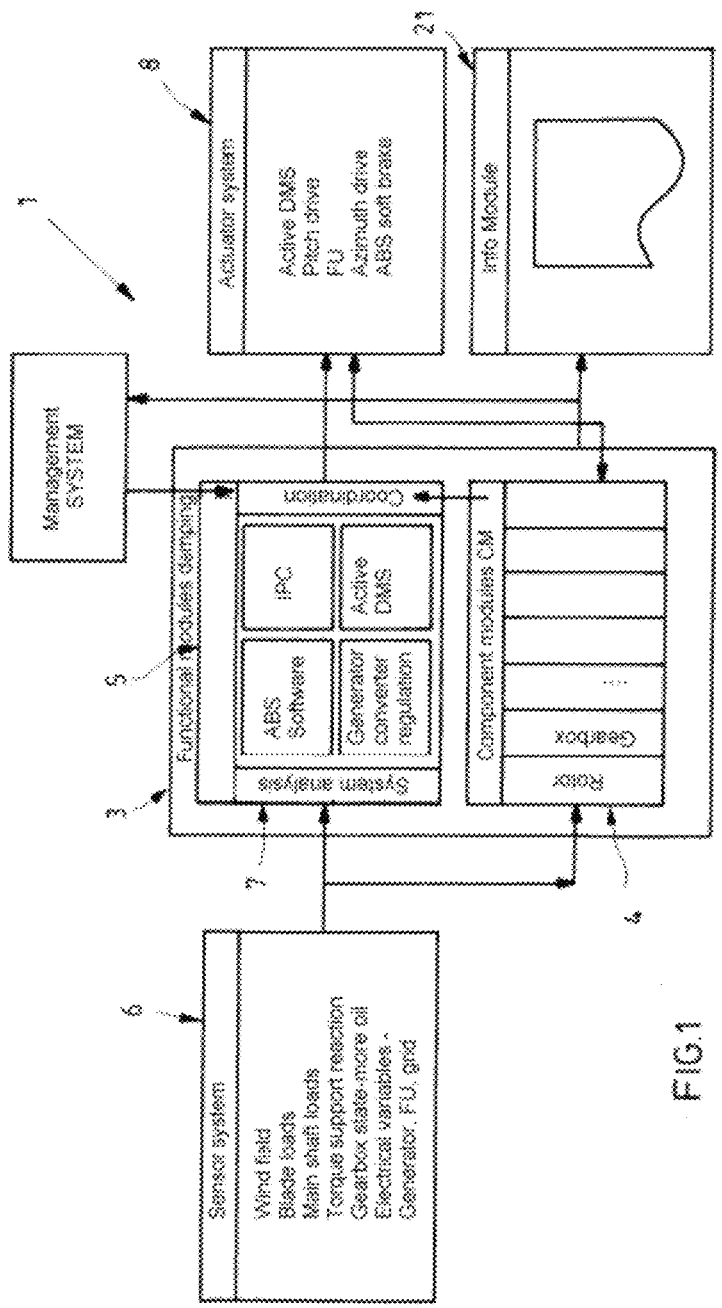
FIG. 1 shows a schematic block diagram of a management system according to one embodiment of the disclosure.

FIG. 1 shows a schematic block diagram of a management system 1 according to one embodiment of the disclosure. The management system 1 allows optimum coordination between component modules 4 and oscillation damping modules 5 in a wind energy installation. For this purpose, the oscillation damping modules 5 have, for example, an ABS soft brake, electronic regulation for the generator and the frequency converter, active torque support and an IPC module. These oscillation damping modules are coordinated with the aid of the management system 1 with the component modules 4 in the wind energy installation so as to damp the building up of natural oscillations in the wind energy installation even in extreme wind conditions, such that the wind energy installation operates with a high energy yield efficiency and does not enter natural oscillation states.

For this purpose, the wind energy installation has an extensive sensor system 6 by means of which both the wind field is predictively measured and blade loads are detected, while loads on the main shaft are determined. The reactions of torque support can also be monitored. Furthermore, the equipment state of the gearbox can be detected, and electrical variables of the generator, frequency converter and grid can be detected by means of appropriate voltage and current sensors. The coordination with the aid of the management system between the oscillation damping modules 5 and an actuator system 8 allows the component modules 4 such as a rotor with rotor blades and rotor hub, as well as a drive train with the main shaft and gearbox and possibly with an ABS brake, to have their oscillation characteristics influenced such that, on the one hand, an optimum energy yield is possible and, on the other hand, no damage can occur to the wind energy installation, even in extreme wind conditions.

For this purpose, the actuator system 8 has active torque support for the gearbox, a pitch drive for the rotor blades, a frequency converter for conversion of the generator frequency to a suitable grid frequency, and an azimuth drive for turning the rotor toward an optimum wind flow, and an ABS soft brake, by means of which it is likewise possible to have a damping effect on the operation of the wind energy installation, with the aid of the management system. In addition to the blocks of the sensor system 6, of the actuator system 8 and of the oscillation damping modules 5 and component modules 4, the management system 1 also has a block for system analysis, by means of which oscillation patterns can be identified, and other predictive and reactive measures can be analyzed. Furthermore, the management system also has an information module 21, in which the various state variables of the component modules and of the oscillation damping modules 5 can be stored and evaluated.

Figure 2:
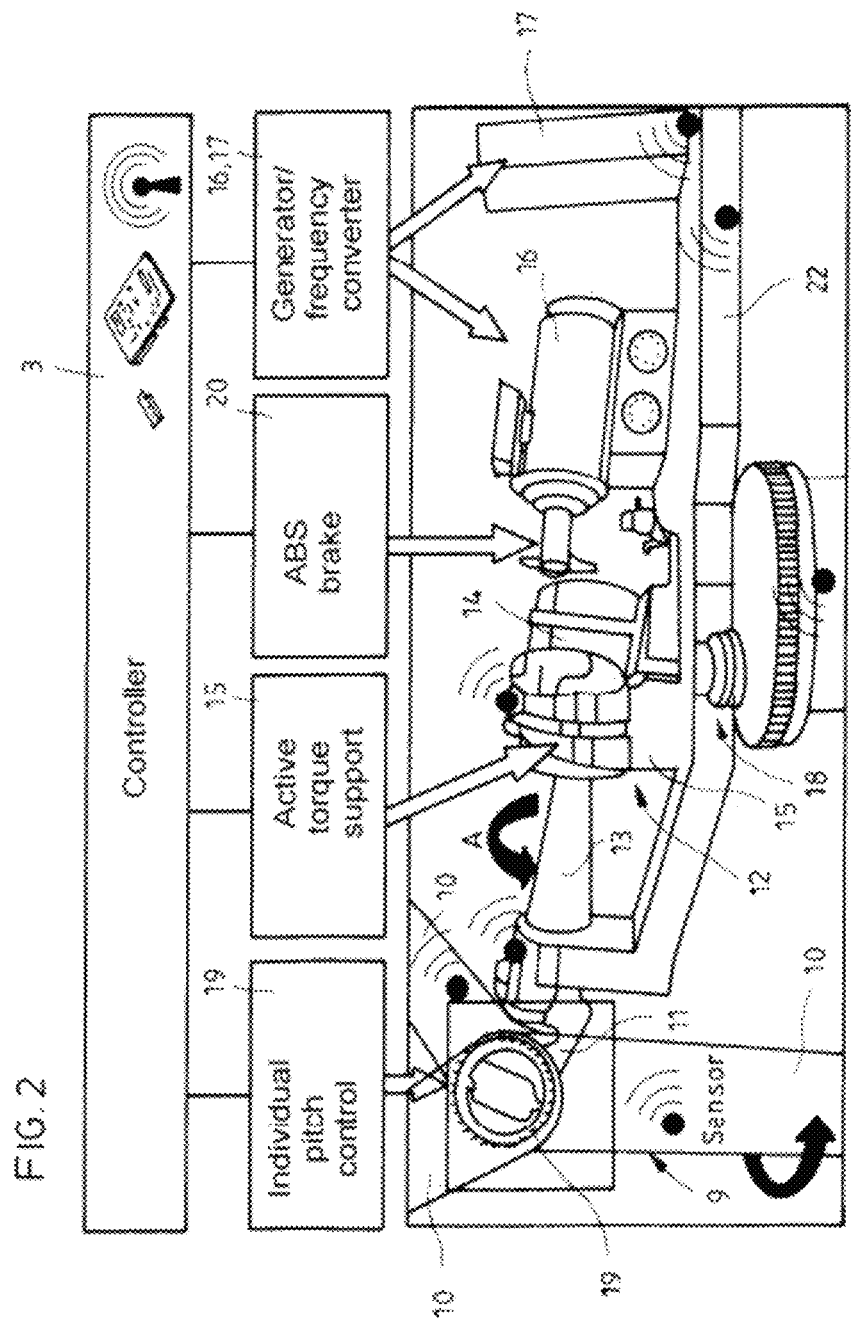
FIG. 2 shows a schematic view of an open nacelle of a wind energy installation with sensor points at which state variables of component modules for the management system are detected.

FIG. 2 shows a schematic view of an open nacelle 22 of a wind energy installation with capabilities for a controller 3 to act via an individual pitch controller 19, active torque support 15, an ABS brake 20 and generator/frequency converter components 16 and 17, in order to damp oscillations in the wind energy installation. For this purpose point sensors are arranged at widely differing monitoring points within the nacelle, transmitting the individual state variables of the component modules to the controller, by radio.

Sensors in rotor blades 10 can detect loads and load changes at an early stage and allow damping of oscillations caused thereby via the individual pitch controller 19. The rotary movements in the direction of the arrow A of the main shaft 13 can also cause oscillations, which can be partially compensated for by active torque support 15, which supports the gearbox 14. From the gearbox 14, the generator 16 is coupled via an ABS brake 20 to the gearbox, with further oscillation damping being possible by means of electronic regulation of the currents and voltages both in the generator and in the frequency converter with the grid being loaded or unloaded.

The azimuth drive 18 ensures that the rotor is always optimally aligned with the wind field, while other sensors detect the structure-borne oscillations of the nacelle 22.

Figure 3:
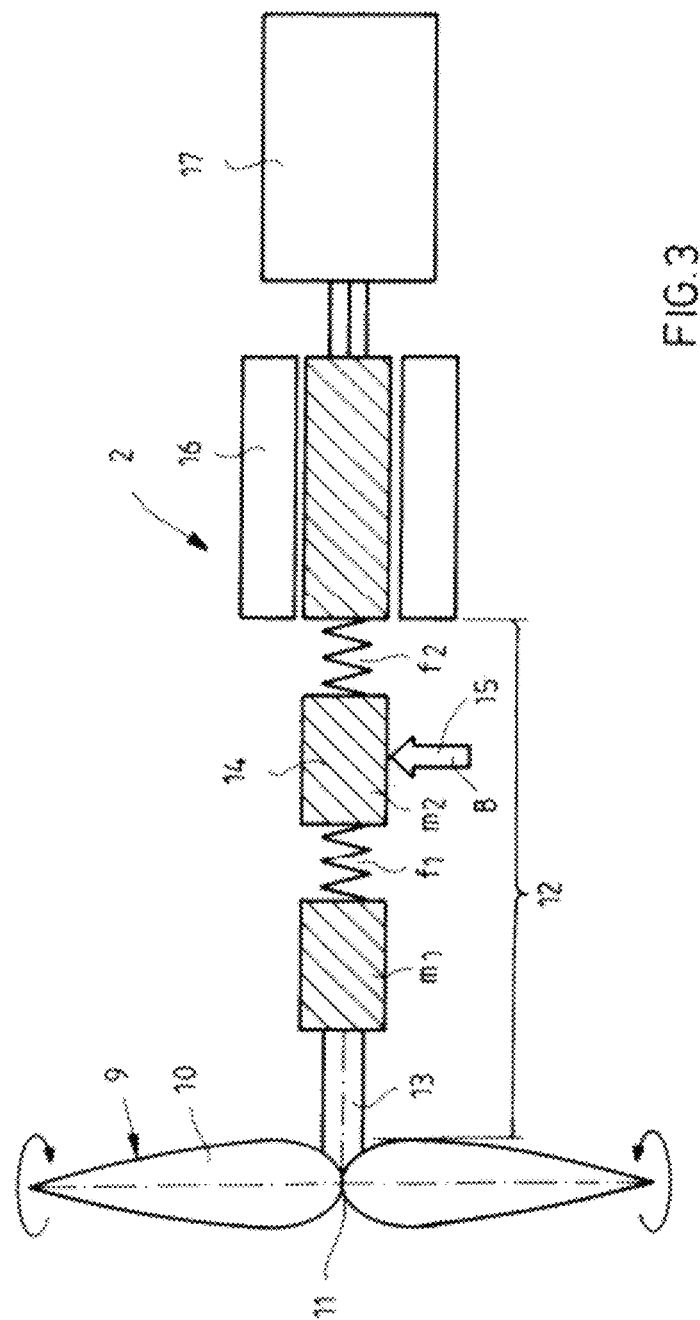
FIG. 3 schematically shows a spring/mass model of the main train of a wind energy installation.

FIG. 3 schematically show a spring/mass model of the main train 12 of a wind energy installation 2. This spring/mass model on the one hand shows the mass m1 of the main shaft 12, which elastically interacts with the mass m2 of the gearbox 14 via f1 by means of the torsion spring. A further coupling via a resilient system such as a shaft which can be twisted indicates the connection to the generator 16, which can likewise be resiliently coupled to the generator 16, with a spring constant f2. A spring/mass model such as this allows the natural oscillations of the main drive train to be calculated, and appropriate damping measures can be taken, for example with the aid of active torque support 15, as indicated by the direction of the arrow B.

Figure 4:
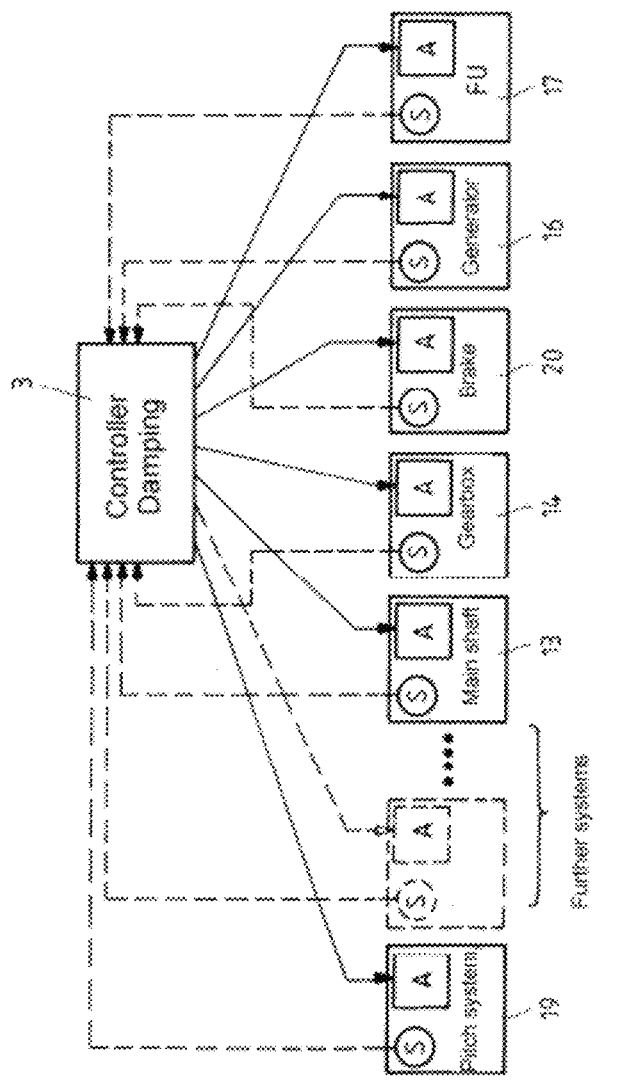
FIG. 4 shows a schematic block diagram of a part of the management system with a central controller for oscillation damping.

FIG. 4 shows a schematic block diagram of a part of the management system with a central controller 3 for oscillation damping. For this purpose, appropriate sensors are arranged on the individual component modules, such as the main shaft 13, the gearbox 14, the generator 16, the frequency converter 17 as well as the pitch drive system 19 and the braking system 22, and signal various state variables to the controller, with the controller having access via appropriate actuators A to the component modules which can oscillate, in order to initiate damping measures.

Figure 5:
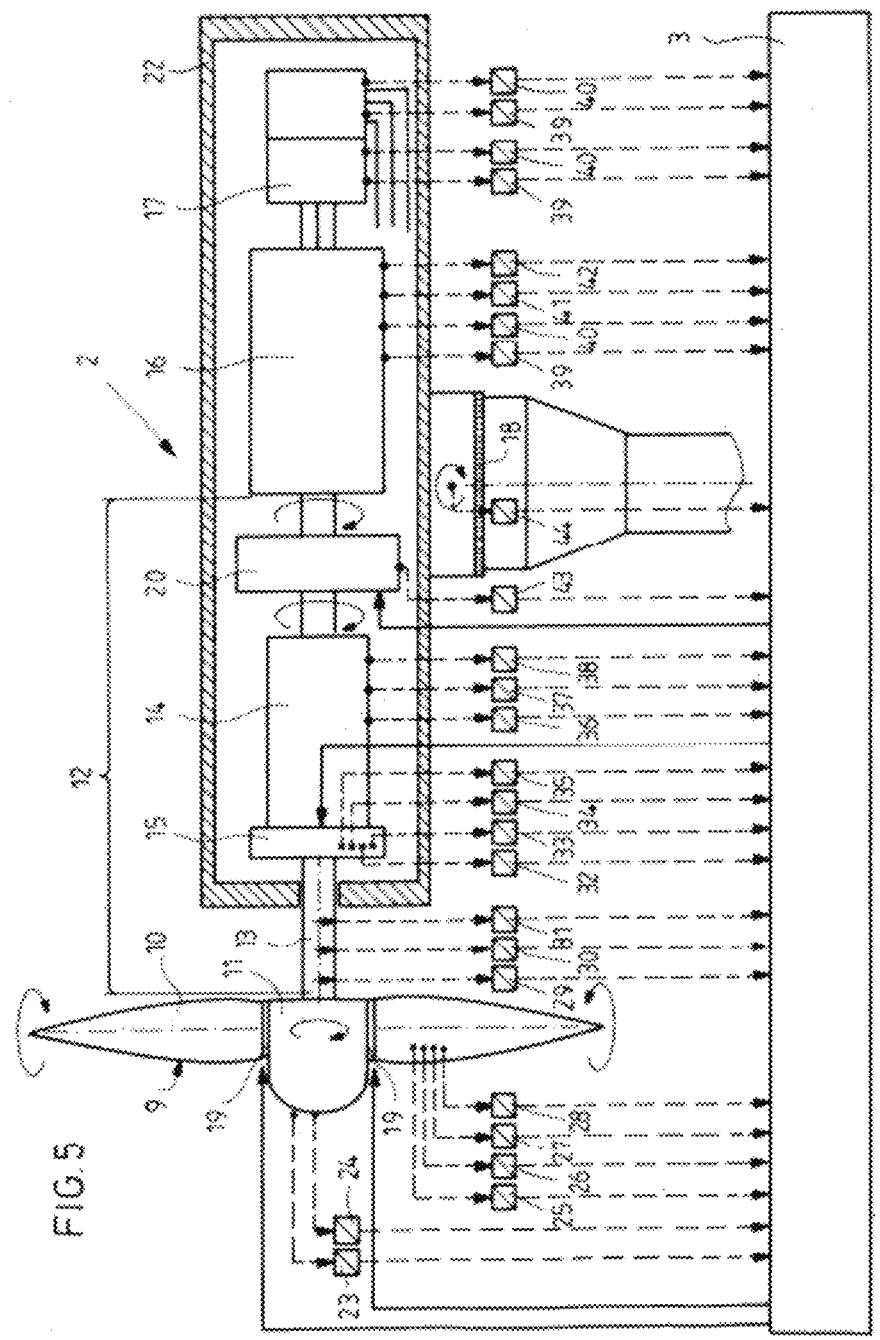
FIG. 5 shows a schematic view of a wind energy installation with possible sensors for monitoring of various component modules and state variables in a wind energy installation.

FIG. 5 shows a schematic view of a wind energy installation 2 with possible sensors for monitoring of various main component modules and state variables of the wind energy installation 2. For example, the wind field can be monitored from the rotor hub 11 by means of a lidar sensor 23 or a sensor 24 based on laser technology, and disturbance variables caused by the wind field can be detected predictively. The blade loads can be detected by means of oscillation sensors 25 based on piezo-electronics or micromechanics, or by means of acceleration sensors. Furthermore, force sensors 26, strain measurement sensors 27 or pressure sensors 28 can be provided in order to determine the blade loads. The main shaft can be checked by means of torsion sensors 29 as well as strain, bending or displacement sensors 30, and appropriate rotation speed sensors 31. Active torque support may have pressure sensors 32, force sensors 33, positioning sensors 34 or acceleration sensors 35, in order to specifically initiate damping measures. The gearbox can in turn be equipped with structure-borne sound sensors 36 in the gearbox and/or at points at which an oscillation peak could occur for relevant frequencies, for example at specific points on the nacelle structure.

In addition, force sensors 37 or strain gauges can be fitted to the gearbox, in order to determine state variables of the gearbox. Finally, a displacement sensor 38 also makes it possible to determine oscillation abnormalities of the gearbox 14. If an ABS soft brake is provided, this may also be equipped with an appropriate sensor 43. A position sensor 44 can be provided for monitoring the azimuth drive 18 of the nacelle 22. The oscillation behavior of the generator 16 can be monitored by means of a current sensor 39 or a voltage sensor 40, and via torque sensors 41 and rotation speed sensors 42. Further current sensors 39 and voltage sensors 40 are provided on the generator side and on the grid side, in order to monitor the wind energy installation 2. These sensors 23 to 44 are connected via appropriate measurement lines in this embodiment of the disclosure to a central controller 3, which causes appropriate actuators, such as the pitch drive system 19 of the rotor 9, the braking system of the ABS soft brake 20 to prevent oscillations from building up, or alternatively this can be done by active torque support 15 for the gearbox 14.

LIST OF REFERENCE SYMBOLS

1 Management system
2 Wind energy installation
3 Controller
4 Component module
5 Oscillation damping module
6 Sensor system
7 System analysis
8 Actuator system
9 Rotor
10 Rotor blade
11 Rotor hub
12 Drive train
13 Main shaft
14 Gearbox
15 Torque support
16 Generator
17 Frequency converter
18 Azimuth drive
19 Pitch drive system
20 ABS soft brake
21 Information module
22 Nacelle
23 Lidar sensor
24 Sensor based on laser technology
25 Oscillation sensor
26 Force sensor
27 Strain sensor
28 Pressure sensor
29 Torsion sensor
30 Strain sensor
31 Rotation speed sensor
32 Pressure sensor
33 Force sensor
34 Position sensor
35 Acceleration sensor
36 Structure-borne sound sensor
37 Force sensor
38 Displacement sensor
39 Current sensor
40 voltage sensor

41 Torque sensor
42 Rotation speed sensor
43 Acceleration or braking sensor
44 Azimuth angle sensor

The invention claimed is:

1. A method using a management system for a wind energy installation comprising:

detecting data relating to at least one of operating states of components of the wind energy installation with respect to reactive oscillations and/or loads and/or predictive prognosis of oscillations and/or loads of and/or on the wind energy installation, and with respect to predictive disturbance variables;

activating actuators of a plurality of oscillation damping modules for damping and/or load reduction of acute or predicted oscillation states of a plurality of component modules and/or of subsystems of the wind energy installation, the plurality of component modules and/or of subsystems of the wind energy installation including at least a rotor, a drive train, and a generator, each of the component modules having at least one oscillation damper module associated therewith;

generating electrical energy with matching to the frequency, current and voltage demand of the downstream grid;

actuating the oscillation damping modules such that the damping measures performed by one of the subsystems are distributed to another of the subsystems when the one of the subsystems fails; and diagnosing damage to a subsystem by changes in the oscillation behavior of the subsystem, and deducing a remaining life of the wind energy installation with the aid of statistical methods based on the measurement results from the sensor system.

* * * * *